United States Patent [19]

Hasegawa

[11] Patent Number: 5,293,245

[45] Date of Patent: Mar. 8, 1994

[54] VIDEO DEMODULATION APPARATUS WITH MOIRE COMPONENT CANCELLATION

[75] Inventor: Junichi Hasegawa, Yokohama, Japan

[73] Assignee: Victor Company of Japan, Ltd., Yokohama, Japan

[21] Appl. No.: 881,613

[22] Filed: May 12, 1992

[30] Foreign Application Priority Data

May 15, 1991 [JP] Japan .................. 3-139605

[51] Int. Cl.$^5$ .............................................. H04N 5/92
[52] U.S. Cl. ..................................... 358/328; 329/320
[58] Field of Search .................. 329/320; 358/23, 328; H04N 5/92

[56] References Cited

U.S. PATENT DOCUMENTS

| 4,166,251 | 8/1979 | Ishigaki et al. ...................... 329/320 |
| 4,843,334 | 6/1989 | Ishikawa et al. . |
| 4,908,581 | 3/1990 | Honjo . |
| 5,157,359 | 10/1992 | Nogami et al. .................... 358/23 X |

FOREIGN PATENT DOCUMENTS

| 0442818 | 8/1991 | European Pat. Off. . |
| 64-78005 | 3/1989 | Japan . |
| 64-78006 | 3/1989 | Japan . |
| 2092813 | 8/1982 | United Kingdom . |

OTHER PUBLICATIONS

Patent Abstracts of Japan, vol. 11, No. 204 (E-520), Jul. 2, 1987, JP-A-62 026 990.

"Two Channel FM Recording for High Definition Baseband Signals" by Itoga et al in IEEE Transactions on Consumer Electronics, vol. 34, No. 1, Feb. 28, 1988, pp. 78–83.

*Primary Examiner*—Mark R. Powell
*Attorney, Agent, or Firm*—Michael N. Meller

[57] ABSTRACT

Image signal demodulation apparatus for demodulating an FM image signal having a carrier, an upper sideband and first and second lower sidebands, of which a modulating signal frequency is comparably close to a frequency of the carrier. The apparatus comprises an equalizer for equalizing a group delay characteristics of the FM image signal at around the carrier frequency, a moire reduction circuit for delaying, with respect to the carrier, respective aliasing components of the first and second lower sidebands by predetermined amounts respectively in response to the output of the equalizer, a limiter for removing amplitude variations of the output of the moire reduction circuit and restoring the upper sideband, a demodulator for demodulating the output of the limiter. The output of the demodulator contains a baseband component having a maximum frequency, and a lowpass filter for passing only the baseband component lower than the maximum frequency. The demodulator together with the moire reduction circuit causes to perform as such that a first moire component generated due to an aliasing caused upon modulation of the FM image signal, becomes opposite in phase relationship to a second moire component generated upon demodulation of the FM image signal, so that the first and second moire components are cancelled out each other.

3 Claims, 3 Drawing Sheets

VIDEO DEMODULATION APPARATUS WITH MOIRE COMPONENT CANCELLATION

BACKGROUND OF THE INVENTION

1. Field of the Invention

The present invention relates to an image signal demodulation apparatus for use in such as a video tape recorder (VTR) and, particularly to an image signal demodulation apparatus capable of reducing moire pattern adequately.

2. Description of the Related Art

A pulse count type demodulator which utilizes zero crossing of an FM image signal as a reference, has been used generally as an FM image signal demodulation apparatus for a VTR. In case of "low" carrier freqeuncy FM signal system in which the carrier frequency $f_c$ of the FM image signal is comparably close to its modulating signal frequency $f_p$, sideband components of the FM image signal are mixed, upon demodulation, into a baseband of the demodulated signal at an FM demodulator of pulse count type, resulting in signal degradation called moire interference.

According to an exemplary method for dealing with such phenomenon, moire components including a component of $2f_c - 2f_p$ which is produced in the pulse counter are attenuated by delaying a first lower sideband signal with respect to the carrier by a predetermined amount of time which may be about 50 n sec when a carrier frequency $f_c$ of the FM signal is 7 MHz, and a modulation frequency $f_p$ is 5 MHz, and advancing a first upper sideband signal with respect to the carrier by a predetermined amount of time which may be about 15 n sec under the same conditions. Alternatively, the carrier frequency $f_c$ may be set to a value which is 1.5 times the maximum frequency of the baseband signal frequency range such that the moire component becomes out of the baseband range.

On the other hand, in a VTR of such as the S-VHS system (one of the Industry Standard Recording/-Playback Systems), the "low" carrier frequency FM recording system mentioned above is employed, there have two sources of degradation of image quality of luminance signal as follows:

[1] As shown in FIG. 1, second and subsequent lower sidebands of an FM signal are frequency-folded with respect to the frequency of 0 Hz generating aliases which interfere in the FM spectrum, resulting a moire interference (hereinafter simply called "moire") after the demodulation. Particularly, when aliases of a first and the second lower sidebands are close in frequency to each other, there may be a beat produced, resulting in conspicuous image quality degradation. A relation between the carrier frequency $f_c$ and the modulating signal frequency $f_p$ in this case can be approximated from $f_c - f_p = -(f_c - 2f_p)$ by equation (1).

$$f_p = 2f_c/3 \tag{1}$$

Frequency $f_m$ of the moire after demodulation due to the aliasing of the second lower sideband becomes as follows:

$$f_m = 2f_c - 2f_p \tag{2}$$

[2] FIG. 2 is a block diagram of a conventional VTR playback system including a conventional image signal demodulation apparatus. An FM signal reproduced from a magnetic tape by a recording/playback head which is not shown, is amplified by a preamplifier 2, and, after its amplitude characteristic and group delay characteristic around the carrier frequency are equalized by a playback equalizer 3, the reproduced FM signal is supplied to an FM demodulator 5 through a limiter 4. When this FM demodulator 5 takes in the form of the pulse counter as shown in FIG. 3, an output signal spectrum becomes as shown in FIG. 4 and frequency components beyond the baseband are attenuated or removed by a low pass filter (LPF) 6. The limiter 4 functions to remove amplitude variation components and to restore the upper sideband. In FIG. 3, reference numerals 8 and 9 indicate a delay circuit and an exclusive OR circuit, respectively. The exclusive OR circuit may be replaced with a multiplier.

As shown in FIG. 4, the output signal contains a component whose frequency is twice the carrier frequency $f_c$ and its lower sidebands $2f_c - 2f_p$, $2f_c - 3f_p$, etc., are mixed in the baseband, causing moire. Particularly, when the frequency of the second lower sideband component "$f_m = 2f_c - 2f_p$" of the doubled carrier frequency, is close to the baseband signal frequency $f_p$, a beat is generated, resulting in substantial degradation of image quality. A relation between $f_c$ and $f_p$, in this case, can be approximated by:

$$f_p = 2f_c/3 \tag{3}$$

because the moire frequency $f_m$ is substantially equal to $f_p$. From the equations of $2f_c - 2f_p = f_m$ and $f_p = 2f_c/3$, frequencies of major moire components in the above mentioned items [1] and [2] are identical to each other.

The above described conventional image signal demodulation apparatus has the following drawbacks:

(1) It requires two processes (adjustments), that is, the process for increasing the group delay time of the lower sideband with respect to the carrier by a predetermined amount and the process for decreasing the group delay time of the upper sideband with respect to the carrier by a predetermined amount.

(2) In VTRs etc., in order to improve the pulse characteristics of the signal after it is demodulated, it is necessary to equalize the group delay characteristics around the carrier frequency. However, it is difficult to do this together with controlling the group delays of the upper and lower sidebands.

(3) It is impossible to cancel moire due to the aliasing of lower sidebands generated upon modulation, although the moire produced upon demodulation can be attenuated.

SUMMARY OF THE INVENTION

Image signal demodulation apparatus for demodulating a frequency modulated image signal having a carrier, an upper sideband and first and second lower sidebands, of which image signal, a modulating signal frequency is comparably close to a carrier frequency of the FM image signal. The apparatus comprises:

equalizer for equalizing a group delay characteristics of the FM image signal inputted thereto at around the carrier frequency thereof;

moire reduction circuit for delaying, with respect to the carrier, respective aliasing components of the first and second lower sidebands by predetermined amounts respectively in response to an output of the equalizer;

limiter for restoring the upper sideband and removing amplitude variations of an output of the moire reduction circuit;

demodulator for demodulating an output of the limiter, an output of the demodulator containing a baseband component having a maximum frequency;

lowpass filter for passing only the baseband component lower than the maximum frequency;

the demodulator together with the moire reduction circuit causing to perform as such that a first moire component generated due to an aliasing caused upon modulation of the FM image signal, becomes opposite in phase relationship to a second moire component generated upon demodulation of the FM image signal by the demodulator, so that the first and second moire components are cancelled out each other.

DETAILED DESCRIPTION OF THE PREFERRED EMBODIMENTS

In an image signal demodulation apparatus according to the present invention, moire components produced according to the items [1] and [2] mentioned previously are cancelled out as such that the reproduced input FM (image) signal undergoes equalization at a reproduction equalizer 3 by which group delay values of the respective aliasing components of the FM signal's first and second lower sidebands, are respectively adjusted (delayed) with respect to the carrier of the FM signal by predetermined amounts, after being limited by a limiter 4, the thus equalized FM signal is demodulated by an FM demodulator 5 causing the moire components produced according to items [1] and [2] to become opposite to each other in phase relationship and to be added and cancelled out each other.

Figure 1:
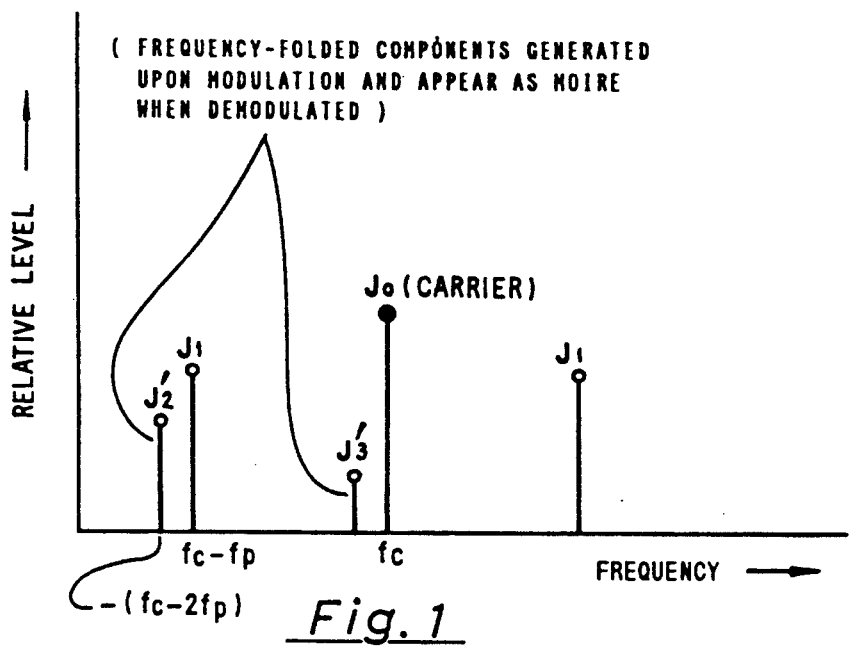
FIG. 1 shows a low carrier frequency FM signal spectrum.
Figure 2:
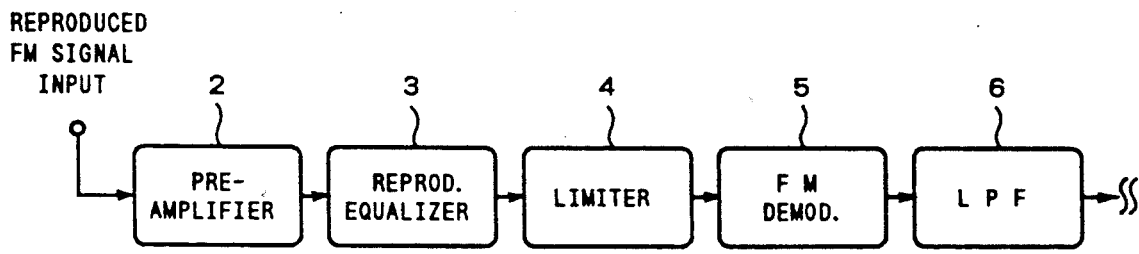
FIG. 2 is a block diagram of a typical example of a conventional image signal demodulation apparatus.
Figure 5:
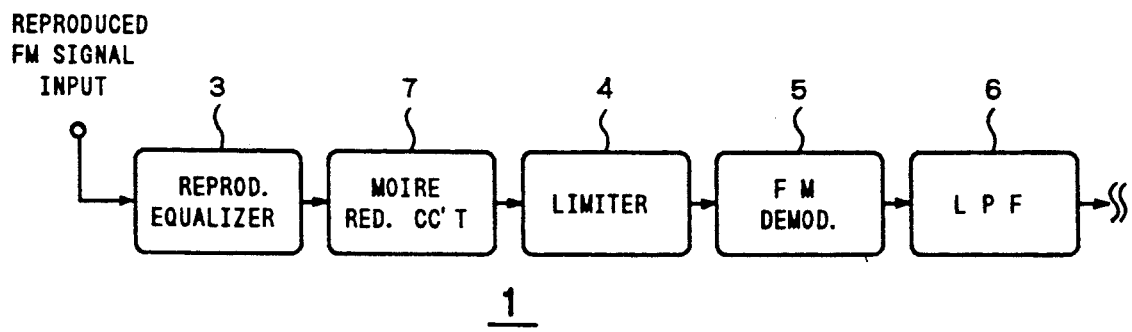
FIG. 5 is a block diagram of an embodiment of the image signal demodulation apparatus according to the present invention.

An embodiment of the image signal demodulation apparatus according to the present invention will be described with reference to FIG. 5 which is a block diagram showing the image signal demodulation apparatus 1 of the present invention. In FIG. 5, same components as those shown in FIG. 2 are depicted by same reference numerals without detailed description thereof. In FIG. 5, a reference numeral 7 depicts a moire reduction circuit, and a preamplifier to be placed in the preceding stage thereof, is omitted.

Depicting an FM signal, a carrier angular frequency and a modulating signal, angular frequency by F(t), $\omega$ and p respectively, the following equation is established:

$$F(t) = J_0 \sin \omega t + J_1 \cdot \{\sin(\omega+p)t - \sin(\omega-p)t\} + J_2 \cdot \{\sin(\omega+2p)t + \sin(\omega-2p)t\} \quad (4)$$

where $J_0, J_1, J_2, \ldots$ represent Bessel functions, $\omega = 2\pi f_c$ and $p = 2\pi f_p$.

Figure 3:
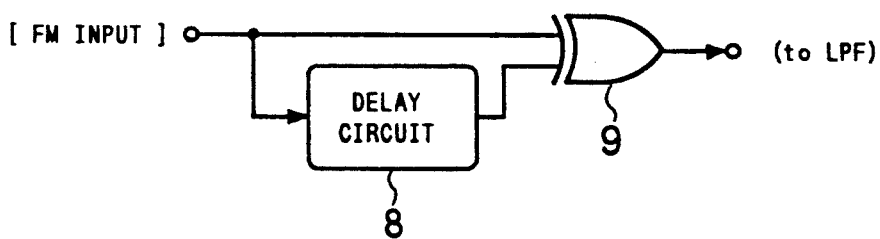
FIG. 3 is a circuit construction of an FM demodulator of pulse count type.
Figure 4:
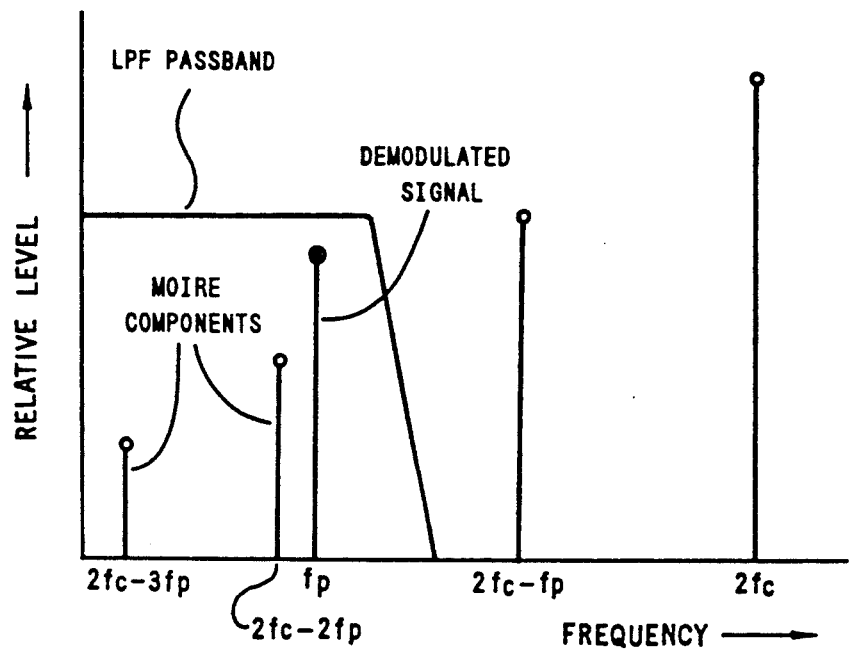
FIG. 4 shows an output signal spectrum of a pulse count type FM demodulator of an FM demodulation apparatus according to the present invention.

An output E(t) of the FM demodulator 5 of pulse count type FM demodulator 5 shown in FIG. 3, can be represented by:

$$E(t) = F(t) \cdot F(t-\tau) \quad (5)$$

$\tau$ is a delay time of the delay circuit 8, and the exclusive OR circuit 9 is performing multiplication actually.

By delaying an aliasing component of a second lower sideband of the FM signal F(t) by a constant time $t_1$ with respect to the carrier of the reproduced FM signal, and demodulating the FM signal after restoration of an upper sideband of the FM signal through the limiter 4, a moire component $M_1$ can be represented by the following equation:

$$M_1 = A \cos\{2(\omega-p)t + 2pt_1 - \omega\tau - \omega t_1 + p\tau\} \quad (6)$$

where $A < 0$. Further, by delaying an aliasing component of a first lower sideband of the FM signal F(t) by a constant time $t_2$ with respect to the carrier and demodulating it after restoration of the upper sideband through the limiter 4, the moire component $M_2$ can be represented by the following equation:

$$M_2 = B \cos\{2(\omega-p)t + 2pt_2 - \omega\tau - 2\omega t_2 + p\tau\} \quad (7)$$

where $B < 0$.

Letting $\phi_1$ and $\phi_2$ represent phases of $M_1$ and $M_2$ respectively, the following equations are obtained:

$$\phi_1 = 2pt_1 - \omega\tau - \omega t_1 + p\tau \quad (8)$$

$$\phi_2 = 2pt_2 - \omega\tau - 2\omega t_2 + p\tau \quad (9)$$

Considering the state of the equation (1) which is influenced by moire much, for simplicity of explanation, the relation between $\phi_1$ and $\phi_2$ can be represented by the following equation since $t_1 = t_2$:

$$\phi_1 = \phi_2 + \omega t_1 = \phi_2 + 2\pi f_c t_1 \quad (10)$$

Assuming $f_c$ of 6.5 Mhz which is a carrier frequency when the luminance signal (modulating signal) has a level of around 50% in IRE scale in which moire becomes conspicuous in the VTR of S-VHS system, it becomes:

$$\phi_1 = \phi_2 + \pi \quad (11)$$

when $t_1$ is set as 77 n sec. By substituting the equation (11) into the equations (6) and (7), the following equations are obtained:

$$M_1 = A \cos\{2(\omega - p)t + \phi_1\} \quad (6')$$
$$M_2 = B \cos\{2(\omega - p)t + \phi_1 - \pi\}$$
$$= -B \cos\{2(\omega - p)t + \phi_1\} \quad (7')$$

Figure 6:
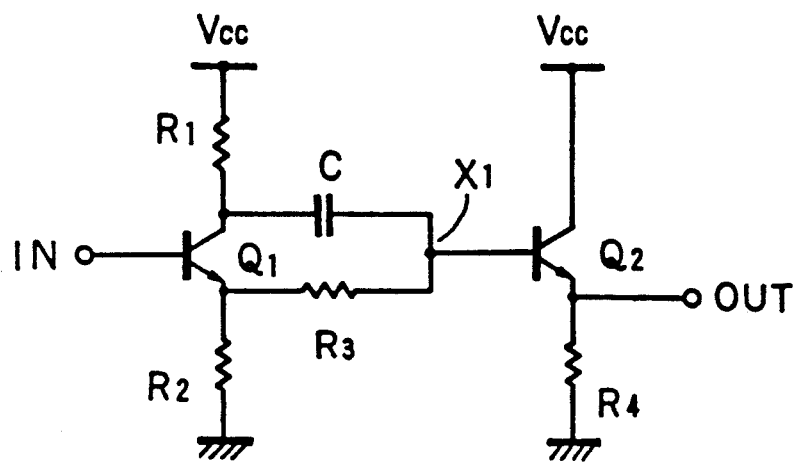
FIG. 6 is a circuit diagram showing an embodiment of a moire reduction circuit of the demodulation apparatus according to the present invention.
Figure 7:
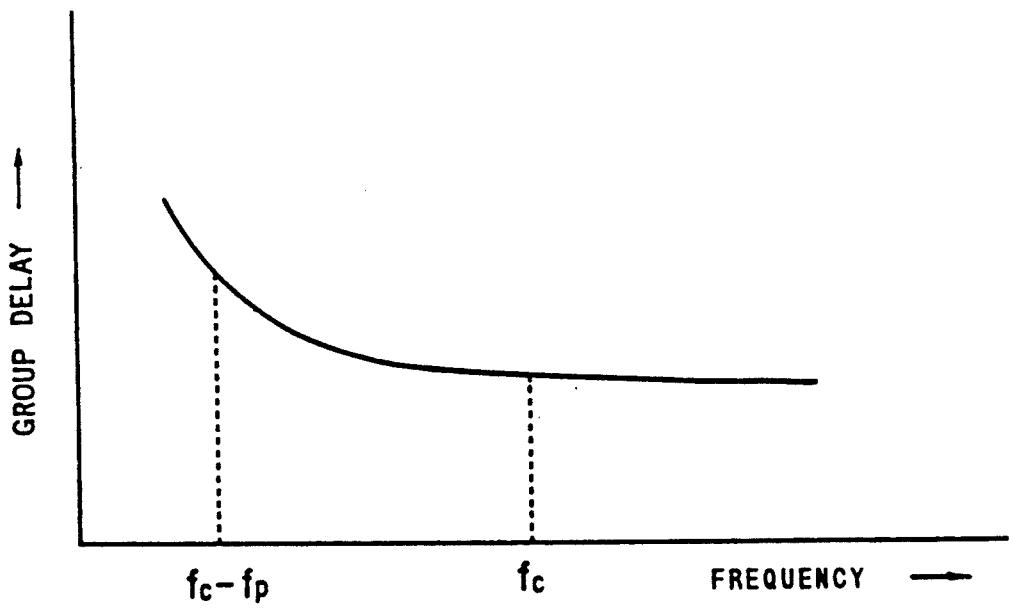
FIG. 7 shows a group delay characteristic of the moire reduction circuit shown in FIG. 6.

Therefore, $M_1$ and $M_2$ are signals of same frequency and opposite in phase. That is, moires produced in the modulation system and in the demodulation system can be reduced simultaneously by means of the moire reduction circuit 7 shown in FIG. 5, resulting in a considerable improvement of image quality. A practical example of the moire reduction circuit 7 which adjusts the group delays, is shown in FIG. 6. In FIG. 6, the circuit includes an NPN transistor Q1 having a base for a signal input, a collector connected to a source voltage Vcc through a resistor R1 and an emitter connected to the ground through a resistor R2, a series circuit of capacitor C and a resistor R3, which series circuit is connected between the collector and the emitter of the transistor Q1, an NPN transistor Q2 having a base connected to a junction $X_1$ of the capacitor C and the resistor R3, a collector connected to the source voltage Vcc and an emitter connected to the ground through a resistor R4, the emitter being used as an output. FIG. 7 shows a group delay characteristic of the circuit shown in FIG. 6. In order to minimize the most conspicuous moire with a given carrier frequency, the group delay characteristics for the aliasing components of the respective first and second lower sidebands, may be adjusted by selecting values of the capacitor C and resistors R1 to R4 so as to satisfy the equation (11), this can be done regardless of the modulating signal frequency, i.e. modulating signal frequency independent.

The moire reduction circuit 7 provided in the image signal demodulation apparatus of the present invention, may be applied to the side of a recording signal processing system (e.g. inserted between the FM modulator and the recording amplifier) of the image signal modulation apparatus or to an image signal recording/reproducing apparatus, with similar effect.

Further, the construction of the moire reduction circuit 7 is not limited to that using an active filter shown in FIG. 6 so long as a desired group delay characteristic is available. Further, in a VTR, etc., it may be possible to obtain the similar characteristic by using a reproduction equalizer circuit (cf. "Introduction of Magnetic Recording Technology", p. 241, published by Sogo Densi Shuppan).

The image signal demodulation apparatus constructed according to the present invention has various advantages such as follows:

(1) The moire interference generated during FM demodulation is attenuated and the moire pattern generated due to aliasing of the lower sideband at FM modulation is also cancelled together. Thus the degradation of image quality due to moire conspicuous in the high frequency luminance signal portion such as an edge of picture etc., can considerably be reduced.

(2) Since the manipulation (adjustment) of the group delay characteristic is necessary to be done for only the lower sideband, the group delay characteristic at around the carrier frequency which is critical to the pulse response after the demodulation, is not subjected by the manipulation. Therefore, there is substantially no distortion of the demodulated signal.

(3) Since the relationship between the carrier frequency, the modulating signal frequency and the amount of group delay adjustment, is clear, designing the demodulation apparatus of the present invention is easy.

(4) In order to avoid moire interference, there is no need for setting a carrier frequency high in design, this is advantageous for VTR, etc. employing the "low" carrier frequency FM recording.

What is claimed is:

1. Image signal demodulation apparatus for demodulating a frequency modulated image signal having a carrier, an upper sideband and first and second lower sidebands, of which FM image signal, a modulating signal frequency is comparably close to a carrier frequency of the FM image signal, said apparatus comprising:
   means for equalizing group delay characteristics of the FM image signal inputted thereto at around the carrier frequency thereof;
   means for delaying, with respect to said carrier, respective aliasing components of said first and second lower sidebands by predetermined amounts respectively in response to an output of said equalizing means;
   limiter for restoring said upper sideband and removing amplitude variations of an output of said delaying means;
   means for demodulating an output of said limiter, an output of said demodulating means containing a baseband component having a maximum frequency;
   means for passing only said baseband component lower than said maximum frequency;
   said demodulating means together with said delaying means causing a first moire component generated due to an aliasing caused upon modulation of said FM image signal to become opposite in phase relationship to a second moire component generated upon demodulation of said FM image signal by said demodulating means, so that said first and second moire components cancel each other.

2. Image signal demodulation apparatus as in claim 1 wherein said means for equalizing group delay characteristic of said FM image signal comprises an active filter.

3. Image signal demodulation apparatus as in claim 2 wherein said active filter comprises:
   a first transistor,
   said image signal is connected to a base of said first transistor, an emitter of said first transistor is connected to ground via a first resistor, the collector of said first transistor is connected to a supply of electrical current via a second resistor;
   a first end of a third resistor is connected ot a junction of said emitter and said first resistor;
   a first side of a capacitor is connected to a junction of said collector and said second resistor;
   a second side of said capacitor and a second end of said third resistor are joined at the base of a second transistor;
   a collector of said second transistor is connected to said supply of electrical current;
   an emitter of said second transistor is connected to ground via a fourth resistor; and
   a junction of said fourth resistor and said emitter of said second transistor provides an output point for said active filter.

* * * * *